United States Patent
Fodrini et al.

(10) Patent No.: US 8,214,204 B2
(45) Date of Patent: Jul. 3, 2012

(54) METHOD FOR GENERATING A VECTOR CODEBOOK, METHOD AND DEVICE FOR COMPRESSING DATA, AND DISTRIBUTED SPEECH RECOGNITION SYSTEM

(75) Inventors: Maurizio Fodrini, Turin (IT); Donato Ettorre, Turin (IT); Gianmario Bollano, Turin (IT)

(73) Assignee: Telecom Italia S.p.A., Milan (IL)

( * ) Notice: Subject to any disclaimer, the term of this patent is extended or adjusted under 35 U.S.C. 154(b) by 940 days.

(21) Appl. No.: 11/658,090

(22) PCT Filed: Jul. 23, 2004

(86) PCT No.: PCT/EP2004/008372
§ 371 (c)(1),
(2), (4) Date: Oct. 6, 2008

(87) PCT Pub. No.: WO2006/007871
PCT Pub. Date: Jan. 26, 2006

(65) Prior Publication Data
US 2009/0037172 A1   Feb. 5, 2009

(51) Int. Cl.
*G10L 19/12* (2006.01)
*G10L 19/00* (2006.01)
(52) U.S. Cl. ......... 704/222; 704/201; 704/230; 704/270
(58) Field of Classification Search .................. 704/222, 704/201, 230, 270
See application file for complete search history.

(56) References Cited

U.S. PATENT DOCUMENTS

| | | | |
|---|---|---|---|
| 4,958,225 A | | 9/1990 | Bi et al. |
| 5,651,026 A | * | 7/1997 | Lin et al. ..................... 375/240 |
| 5,774,839 A | * | 6/1998 | Shlomot ..................... 704/222 |
| 5,946,653 A | | 8/1999 | Campbell et al. |
| 5,966,688 A | * | 10/1999 | Nandkumar et al. ......... 704/222 |
| 6,009,387 A | * | 12/1999 | Ramaswamy et al. ........ 704/222 |
| 6,067,515 A | * | 5/2000 | Cong et al. .................... 704/243 |
| 6,148,283 A | * | 11/2000 | Das .............................. 704/222 |

(Continued)

FOREIGN PATENT DOCUMENTS
CN   1190772 C   2/2005
(Continued)

OTHER PUBLICATIONS
Franti et al. "On the design of a Hierarchical BTC-VQ compression system", Signal Processing: Image Communication, 8, 551-562, 1996.*

(Continued)

*Primary Examiner* — Jialong He
(74) *Attorney, Agent, or Firm* — Finnegan, Henderson, Farabow, Garrett & Dunner, L.L.P.

(57) ABSTRACT

A method for compressing data, the data being represented by an input vector having Q features, wherein Q is an integer higher than 1, including the steps of 1) providing a vector codebook of sub-sets of indexed Q-feature reference vectors and threshold values associated with the sub-sets for a prefixed feature; 2) identifying a sub-set of reference vectors among the sub-sets by progressively comparing the value of a feature of the input vector which corresponds to the prefixed feature, with the threshold values associated with the sub-sets; and 3) identifying the reference vector which, within the sub-set identified in step 2), provides the lowest distortion with respect to the input vector.

23 Claims, 10 Drawing Sheets

U.S. PATENT DOCUMENTS

| | | | |
|---|---|---|---|
| 6,161,086 A * | 12/2000 | Mukherjee et al. | 704/207 |
| 6,389,389 B1 | 5/2002 | Meunier et al. | |
| 6,438,268 B1 * | 8/2002 | Cockshott et al. | 382/253 |
| 2001/0010038 A1 * | 7/2001 | Kang et al. | 704/222 |
| 2002/0147579 A1 * | 10/2002 | Kushner et al. | 704/207 |
| 2004/0176950 A1 * | 9/2004 | Chu | 704/207 |

FOREIGN PATENT DOCUMENTS

| | | |
|---|---|---|
| EP | 0 496 541 | 7/1992 |
| JP | 2001-251192 | 9/2001 |
| WO | WO 02/062120 A2 | 8/2002 |
| WO | WO-02/062120 A2 | 8/2002 |

OTHER PUBLICATIONS

Arya et al. "Algorithm for for fast vector quantization". In Proceedings of the DCC'93: Data Compression Conference. J. A. Storer and M. Cohn, eds. IEEE Press, New York, pp. 381-390.*

Ramasubramanian et al.; "Fast K-Dimensional Tree Algorithms for Nearest Neighbor Search with Application to Vector Quantization Encoding"; IEEE Transactions on signal Processing, vol. 40, No. 3, pp. 518-530, (1992).

ETSI; "Speech Processing, Transmission and Quality Aspects (STQ); Distributed Speech Recognition; Front-End Feature Extraction Algorithm; Compression Algorithms"; ETSI ES 201 108 V1.1.2, pp. 1-20, (2000).

"Speech Processing, Transmission and Quality Aspects (STQ); Distributed speech recognition; Extended front-end feature extraction algorithm; Compression algorithms; Back-end speech reconstruction algorithm," ESTI ES 202 211 V.1.1.1 (Nov. 2003), ETSI Standard, 74 pages.

"Speech Processing, Transmission and Quality Aspects (STQ); Distributed speech recognition; Advanced front-end feature extraction algorithm; Compression algorithms," ETSI ES 202 050 V1.1.5 (Jan. 2007), ETSI Standard, 45 pages.

"Speech Processing, Transmission and Quality Aspects (STQ); Distributed speech recognition; Extended advanced front-end feature extraction algorithm; Compression algorithms; Back-end speech reconstruction algorithm," ETSI ES 202 212 V1.1.2 (Nov. 2005), ETSI Standard, 93 pages.

* cited by examiner

|  | $C_A$ | $C_B$ |
|---|---|---|
| $C_1$ | $C_{1,A}$ | $C_{1,B}$ |
| $C_2$ | $C_{2,A}$ | $C_{2,B}$ |
| $C_3$ | $C_{3,A}$ | $C_{3,B}$ |
| ⋮ | ⋮ | ⋮ |
| $C_i$ | $C_{i,A}$ | $C_{i,B}$ |
| ⋮ | ⋮ | ⋮ |
| $C_{N-1}$ | $C_{N-1,A}$ | $C_{N-1,B}$ |
| $C_N$ | $C_{N,A}$ | $C_{N,B}$ |

$N$ rows, $2$ columns

Fig. 3

METHOD FOR GENERATING A VECTOR
CODEBOOK, METHOD AND DEVICE FOR
COMPRESSING DATA, AND DISTRIBUTED
SPEECH RECOGNITION SYSTEM

CROSS REFERENCE TO RELATED APPLICATION

This application is a national phase application based on PCT/EP2004/008372, filed Jul. 23, 2004, the content of which is incorporated herein by reference.

BACKGROUND OF THE INVENTION

1. Field of the Invention

The present invention relates to a method for compressing data. More in particular, the present invention relates to a method for compressing feature vectors in a distributed speech recognition system.

2. Description of the Related Art

Many applications make use of speech recognition techniques. Examples include:

Interactive Voice Response (IVR) services based on speech recognition of "sensitive" information, such as banking and brokerage transactions. Speech recognition features may be stored for future human verification purposes or to satisfy procedural requirements;

human verification of utterances in the speech database collected from a deployed speech recognition system. This database can then be used to retrain and tune models in order to improve system performance;

applications where machine and human recognition are mixed (e.g. human assisted dictation).

An application of speech recognition is also disclosed by U.S. Pat. No. 5,946,653, which describes a technique to control a target system by recognising a spoken command and then applying a stimulus to the target system based on the recognised spoken command. Target systems and software applications controlled using voice command are desirable because a user can control the target systems or applications by speaking commands thereby improving the ease of operations and user friendliness perceived by the user.

In a typical speech recognition system an input speech is received through a microphone, sampled and converted to a digital representation of the original input speech. The digitised speech is then processed (according to a commonly called "feature extraction" or "front-end" processing) so as to create feature vectors which provide a representation of the speech in a more compact format. The feature vectors are then transmitted or passed to a pattern recognition and/or reconstruction system, commonly called the "back-end", that compares the incoming feature vectors to speech templates in order to reconstruct the input speech.

Speech recognition and/or reconstruction in the back-end typically requires search algorithms that use large amounts of memory and CPU cycles.

Three main approaches are known in the art for speech processing:

server-side: the audio signal is sent to the server by the device through a transmission channel. The server performs all the audio signal processing and send back to the device the results of the recognition process. This approach has the limitation of the absence of graphical displays and of the instability of the connection between the device and the server. With low-resolution analog-to-digital conversion, the transcoding and transmission losses and all the errors inherent in every wireless technology, the quality of the digitised audio signal is sometimes insufficient for successful speech recognition;

client-side: the speech processing is completely performed in the user's device. While this approach solves the audio channel problems, the client device needs to have heavy processing and memory capabilities and low consumption; however, wireless hand-held devices such as Personal Digital assistants (PDAs), cell phones, and other embedded devices are typically limited in computation, memory, and battery energy. Complex search algorithms are thus difficult to perform on these conventional devices due to said resource limitations.

distributed speech recognition (DSR): speech recognition tasks are performed part in the client device and part on the server. The client device extracts specific features on the user's digitised speech and sends these digital representation to the server. The server finishes the process, by comparing the extracted information with the language models and vocabulary lists that are stored in the server, so that the wireless device is less memory-constrained. Other advantages of this approach are the possibility of adding voice interface to a variety of mobile devices without significant hardware requirements, the possibility of easily updating services, content and code, and low sensitivity to errors (these systems can typically handle data packet losses of up to 10% without detrimental impacts on the speech recognition accuracy).

The distributed speech recognition (DSR) system therefore provides that only the front-end processing is performed in the wireless hand-held device while the computational and memory intensive back-end processing is performed at a remote server (see for example, EP 1 395 978).

Moreover, in order to save communication channel bandwidth, it has been proposed in the art to compress the feature vectors extracted in the front-end processing of a DSR system, before their transmission to the remote server for the back-end processing. This compression is commonly called in the art "vector quantization" or "vector compression".

In this context, the European Telecommunication Standards Institute (ETSI) released a standard ("Aurora") for DRS feature extraction and compression algorithms (ETSI ES 202.050, ES 202 212, ES 201 108 and ES 202 211).

According to the feature extraction algorithm of Aurora ETSI standard, the digitised input speech is filtered, each speech frame is windowed using a Hamming window and transformed into the frequency domain using a Fast Fourier Transform (FFT). Then a Mel-frequency domain transformation and subsequent processing steps are performed so as to obtain a vector comprising 14 features—twelve static Mel cepstral coefficients $C(1)$ to $C(12)$, plus the zero cepstral coefficient $C(O)$ and a log energy term lnE—for each time frame of the speech data (see also EP 1 395 978).

According to the compression algorithm of Aurora ETSI standard, the 14 features are then grouped into pairs thereby providing seven two-feature vectors for each time frame of the speech data. These two-feature vectors are then compressed by using seven respective predetermined codebooks.

A codebook is a set of predetermined indexed reference vectors which are chosen to be representative of the original information, represented by the feature vectors. The distribution of reference vectors in the codebook may be non-uniform, as provided for by the Aurora ETSI standard.

The compression or quantization is performed by replacing an input vector with the index of the reference vector that offers the lowest distortion.

Indeed, as the index is a positive integer value between 0 and $N-1$ (wherein N is the number of reference vectors in a codebook), it can be represented by a more compact information than an input feature vector comprising Q features, with $Q \geq 2$.

According to ETSI algorithm, the lowest distortion is found by evaluating a weighted Euclidean distance between an input vector and each reference vector of the respective codebook. Once the closest reference vector is found, the index of that reference vector is used to represent that input vector.

The value of minimum distance Dmin computed with an Euclidean distance for two-feature vectors is expressed as $$D_{min} = \underset{1 \leq i \leq N}{\operatorname{argmin}} \left\{ \sqrt{(C_{i,A} - X_A)^2 + (C_{i,B} - X_B)^2} \right\}$$

wherein N is the number of vectors in the codebook; $(X_A, X_B)$ is the input vector and $C_i = (C_{i,A}, C_{i,B})$ is the i-th vector of the codebook.

According to the above expression, the conventional ETSI compression algorithm (exhaustive computation) requires N computation of distance, equivalent to the evaluation of 2·N squares and 3·N additions (the computation of the square root can be omitted, because it does not affect the result of the search of the minimum value $D_{min}$). These operations require a high processor capacity proportional to N.

Attempts have been made in the art in order to improve the compression algorithm as, for example, disclosed in EP 0 496 541, U.S. Pat. No. 5,946,653, U.S. Pat. No. 6,389,389.

However, the techniques disclosed by these documents do not efficiently reduce the computational effort required to find the vector of a codebook which has the minimum distance from an input vector.

A different vector quantization technique, in this case for video data compression, is proposed in U.S. Pat. No. 4,958,225. In particular, this patent discloses a method for compressing video data employing vector quantization for identifying one of a set of codebook vectors which most closely matches an input vector. According to an embodiment, the method comprises the following steps: 1) computing the norm of an input vector I; 2) identifying a reference codebook vector Aj which has a norm closest to the norm of the input vector; 3) computing the distance $h_{I,j}$ between the input vector I and the reference codebook vector Aj; 4) identifying a subset S of the codebook vectors made up of codebook vectors from a limited volume of the vector space around the input vector I, such as vectors having a norm in the range $|I|-h_{I,j}$ to $|I|+h_{I,j}$; 5) search the subset S for the codebook vector having the smallest distance to the input vector; 6) select the codebook vector having the smallest distance to the input vector. The identification in step 4) of the subset S reduces the number of vectors which must be evaluated in step 5) for the smallest distance computation.

However, the Applicant notes that, even if this method reduces the number of distance computation which has to be computed between the input vector and the reference vectors to that of the reference vectors included in the subset S, it still requires a large number of computations and instructions to be executed through steps 1 to 6. Moreover, only the norms of all reference codebook vectors can be calculated off-line in advance and stored in memory to be used later, when step 2) has to be performed. Therefore, the on-line computational effort required by this method is still high.

SUMMARY OF THE INVENTION

Accordingly, the Applicant faced the technical problem of reducing the computational effort required for feature vector compression.

More in particular, the Applicant faced the technical problem of reducing the on-line computational effort required for feature vector compression in a DSR system.

The Applicant found that the above problem can be solved through a processing of the codebook which provides a division of the codebook in predetermined regions, each comprising a subset of reference vectors of the codebook, and a generation of predetermined access information to the predetermined regions in such a way that the vector compression—which has to be performed on-line every time a new input vector is received—can be performed simply by identifying, through the generated access information, the region which better represents that input vector and by searching for the reference vector which offers the lowest distortion only within the identified region, which contains a number of reference vectors lower than that of the codebook. The on-line computational effort required for feature vector compression is thus reduced. Moreover, as the codebook processing can be executed off-line, only once for any given codebook, it does not so weight on the on-line processing.

It is therefore a first aspect of the invention a method for generating a vector codebook providing low data compression computational effort starting from a vector codebook comprising a set of N reference vectors each comprising Q features, wherein N and Q are positive integers higher than 1, the method comprising the steps of a) sorting the set of N reference vectors in ascending or descending order with respect to the values of a prefixed feature of the set of N reference vectors;

b) subdividing the set of sorted reference vectors in sub-sets;

c) associating with each of said sub-sets a respective threshold value for the prefixed feature.

In the present description and claims the term "vector" is used to indicate an ordered set of scalars. The dimension of a vector is the number of scalar elements of the ordered set. For example, a two-dimensional vector may be designated as {a1, a2}, wherein a1 is the first scalar element of the vector and a2 is the second scalar element.

Moreover, the term "feature" is used to indicate a scalar. For example, in case of speech recognition system the term "feature" is used to indicate a coefficient extracted by a feature extraction algorithm from an input speech.

The dependent claims relate to particular embodiments of the invention.

Advantageously, the method further comprises a further splitting of said set of N reference vectors, said further splitting comprising the steps of:

d) sorting the reference vectors of each of said sub-sets in ascending or descending order with respect to the values of a further prefixed feature of the set of N reference vectors;

e) subdividing each of said sub-sets of sorted reference vectors in further sub-sets;

f) associating with each of said further sub-sets a respective further threshold value for the further prefixed feature.

According to an embodiment, the step of further splitting is repeated for a prefixed number of times, considering each time as sub-sets the further sub-sets obtained in the previous execution of the further splitting and, for performing the steps d) and f), another further prefixed feature of the set of N reference vectors.

The step of further splitting can be repeated for any other of remaining feature of the set of reference vectors not yet considered for the sorting step. Preferably, it is repeated for all the remaining feature of the set of reference vectors.

In step c) the threshold values are advantageously selected depending on the values of the prefixed feature of the set of N reference vectors.

In step c) each threshold value is advantageously selected depending on the values of the prefixed feature of the reference vectors comprised in the respective sub-set.

In step c) each threshold value can be set to a value comprised between the value of the prefixed feature of the last reference vector of the respective sub-set and the value of the prefixed feature of the first reference vector of the next sub-set, if any. Preferably, each threshold value is set to a value equal to the value of the prefixed feature of the last reference vector of the respective sub-set.

In step f) the further threshold values are advantageously selected depending on the values of the further prefixed feature of the set of N reference vectors.

In step f) each further threshold value is advantageously selected depending on the values of the further prefixed feature of the reference vectors comprised in the respective further sub-set.

In step f) each further threshold value can be set to a value comprised between the value of the further prefixed feature of the last reference vector of the respective further sub-set and the value of the further prefixed feature of the first reference vector of the next further sub-set, if any. Preferably, each further threshold value of step f) is set to a value equal to the value of the further prefixed feature of the last reference vector of the respective further sub-set.

Step d) can be carried out either in ascending or descending order independently of the order used in step a).

In step b) the sorted set is subdivided in Nfirst sub-sets, wherein Nfirst is a positive integer with $2 \leq Nfirst \leq N$.

Advantageously, the sub-sets obtained in step b) comprise substantially the same number of reference vectors. That is, the number of reference vectors of the sub-sets is equal to N/Nfirst for almost all the sub-sets.

It is noted that the above mentioned expression "the sub-sets comprise substantially the same number of reference vectors" is used to comprise the case in which the remainder of the division N/Nfirst is different from zero so that the number of reference vectors of the sub-sets cannot be equal to N/Nfirst for all the sub-sets.

Preferably, in step e) each sub-set is subdivided by the same number Nsecond of further sub-sets, wherein Nsecond is a positive integer higher than 1. Moreover, Nsecond is preferably not higher than the number of reference vectors of the sub-set having the lowest number of reference vectors.

Advantageously, in step e) each sub-set is subdivided in further sub-sets comprising substantially the same number of reference vectors.

As explained more in detail below, further sub-sets comprising substantially the same number of reference vectors allow the computational effort to be substantially the same for all received input vectors, independently from the region of the codebook in which they are contained.

Advantageously, the method further comprises a step g) of extending at least one of the sub-sets obtained in step b) with at least one reference vector of an adjacent sub-set.

Advantageously, step g) is carried out by extending the sub-set obtained in step b) which is at the top of the set sorted in step a) by adding at the bottom thereof at least one reference vector corresponding to the reference vector that, in the set sorted in step a), is immediately below such top sub-set.

Advantageously, step g) is carried out by extending the sub-set obtained in step b) which is at the bottom of the set sorted in step a) by adding at the top thereof at least one reference vector corresponding to the reference vector that, in the set sorted in step a), is immediately above such bottom sub-set.

Advantageously, step g) is carried out by extending any other central sub-set obtained in step b) by adding at the top and at the bottom thereof at least one reference vector corresponding to the reference vector that, in the set sorted in step b), is immediately above and below such central sub-set.

As explained in more detailed below, step g) generates an overlapping between adjacent sub-sets which allows—in a vector compression method which uses the codebook generated by the method of the invention—a reduction of error in minimum distortion computation for input vectors located near the border of adjacent regions of the codebook, which are represented by the sub-sets.

Advantageously, when step g) is carried out, steps d) and e) are carried out on the extended sub-sets.

Advantageously, in step g) the sub-sets are extended at the top and/or at the bottom thereof by the same number of reference vectors.

Advantageously, the further splitting also comprises, after step e), the step h) of extending at least one of the further sub-sets obtained in step e) with at least one reference vector of an adjacent further sub-set.

Advantageously, step h) is carried out by extending each further sub-set obtained in step e) which is at the top of the corresponding extended sub-set sorted in step d) by adding at the bottom thereof at least one reference vector corresponding to the reference vector that, in the corresponding sorted extended sub-set is immediately below such top further sub-set.

Advantageously, step h) is carried out by extending each further sub-set obtained in step e) which is at the bottom of the corresponding extended sub-set sorted in step d) by adding at the top thereof at least one reference vector corresponding to the reference vector that, in the corresponding sorted extended sub-set, is immediately above such bottom further sub-set.

Advantageously, step h) is carried out by extending any other central further sub-set obtained in step e) by adding at the top and at the bottom thereof at least one reference vector corresponding to the reference vector that, in the corresponding extended sub-set sorted in step d), is immediately above and below such central further sub-set.

Advantageously, when step h) is performed, the step of further splitting is repeated considering each time as sub-sets the further sub-sets extended according to the previous execution of step h).

As explained in more detailed below, step h) generates an overlapping between adjacent further sub-sets which allows—in a vector compression method which uses the codebook generated by the method of the invention—a reduction of error in minimum distortion computation for input vectors located near the border of adjacent regions of the codebook, which are represented by the further sub-sets.

Advantageously, in step h) the further sub-sets are extended at the top and/or at the bottom by the same number of rows.

In a second aspect the present invention relates to an electronic processing system for generating a vector codebook providing low data compression computational effort comprising means adapted to carry out the steps of the method according to the first aspect of the invention.

The electronic processing system can be for example a Personal Computer, a computer network or an embedded device as a wireless hand-held device (e.g. a PDA or a cell phone).

In a third aspect the present invention relates to a computer program comprising program instructions adapted to carry out the steps of the method according to the first aspect of the invention when the program is executed on an electronic processing system.

Advantageously, the computer program is embodied on a computer readable medium.

For example, the computer readable medium is a read-only memory or a magnetic recording means. Typical examples of read-only memories are CD ROM or a semiconductor ROM. In turn, typical examples of magnetic recording means are floppy disk or hard disk.

According to one embodiment, the computer program is carried on a carrier signal, for example, when transmitted in a computer network, as the Internet.

Typically, the carrier signal is an electrical or optical signal. For example, it can be a radio wave signal or an electrical signal generated by a modem. Such a carrier signal can, for example, be carried by an electric or optical cable, by radio waves or by other conventional means of transmission.

In a fourth aspect the present invention relates to method for compressing data, said data being represented by an input vector having Q features, wherein Q is an integer higher than 1, the method for compressing data comprising the steps of
1) providing a vector codebook comprising sub-sets of indexed Q-feature reference vectors and threshold values associated with said sub-sets for a prefixed feature, as generated by a method according to the first aspect of the invention;
2) identifying a sub-set of reference vectors among said sub-sets by progressively comparing the value of a feature of the input vector—which corresponds to said prefixed feature—with the threshold values associated with said sub-sets;
3) identifying the reference vector which—within the sub-set identified in step 2)—provides the lowest distortion with respect to the input vector.

According to the invention, vector compression can be executed by a simple comparison step (step 2) and by identifying the reference vector which provides the lowest distortion only within the identified sub-set which comprises a number of reference vectors lower than the codebook. The computational effort required for vector compression is therefore reduced.

Moreover, the generation of the codebook according to the first aspect of the invention can be executed off-line only once for any given codebook. Therefore it does not overload the compression method, which has to be performed on line each time an input vector is received.

Typically, the distortion is computed by means of a function adapted to process two or more input vectors so as to provide a scalar representative of the distortion. Typically, said function implements an Euclidean distance. However, it can implements any type of distance.

Advantageously, step 3) is carried out by identifying the reference vector which has the minimum distance from the input vector. Typically, this is carried out by computing the distance between the input vector and each reference vector comprised in the sub-set identified in step 2).

Advantageously, the compression method further comprises a step of associating the index of the reference vector identified in step 3) with the input vector.

Advantageously, in step 1) further sub-sets of indexed Q-feature reference vectors and further threshold values associated with said further sub-sets for a further prefixed feature are also provided for each sub-set of reference vectors, as generated by the method according to the first aspect of the invention.

Advantageously, the compression method further comprises a step 4) of identifying a further sub-set, among the further sub-sets corresponding to the sub-set identified in step 2), by progressively comparing the value of a further feature of the input vector—corresponding to said further prefixed feature—with the further threshold values associated with said further sub-sets; step 3) being performed within the further sub-set identified in step 4).

Advantageously, in step 1) extended sub-sets as generated by step g) of the method according to the first aspect of the invention are provided, steps 2 and 3) being performed on the extended sub-sets.

Advantageously, in step 1) extended further sub-sets as generated by step h) of the method according to the first aspect of the invention are provided, steps 4) and 3) being performed on the extended further sub-sets.

In a fifth aspect the present invention relates to an electronic processing system for compressing data comprising means adapted to carry out the steps of the method according to the fourth aspect of the invention.

The electronic processing system can be for example a Personal Computer, a computer network, an embedded device as a wireless hand-held device (e.g., a PDA or a cell phone) or, in particular, a user device of a DSR system.

In a further aspect the present invention relates to a computer program comprising program instructions adapted to carry out the steps of the method according to the fourth aspect of the invention when the program is executed on a electronic processing system.

As far as the characteristics of the computer program are concerned reference is made to what described above with reference to the third aspect of the invention.

In a further aspect the present invention relates to a device suitable for data compression comprising
   a feature extraction unit for processing a digital input data so as to provide Q-feature vectors, wherein Q is an integer higher than 1;
   a memory unit for storing at least one vector codebook comprising predetermined sub-sets of sorted indexed Q-feature reference vectors and predetermined thresholds associated with said sub-sets;
   a data compression unit for identifying, for each input Q-feature vector provided by the feature extraction unit, one of the stored sub-sets by comparing a predetermined feature of the input vector with the predetermined thresholds; and for identifying, within the identified sub-set, the reference vector which provides the lowest distortion with respect to the input feature vector.

Advantageously, the data compression unit is also adapted to associate the index of the reference vector providing the lowest distortion with the input Q-feature vector.

Advantageously, the data compression unit is adapted to carry out the steps of the method according to the fourth aspect of the invention.

Advantageously, the memory unit is adapted to store the (extended) sub-sets or (extended) further sub-sets of sorted indexed Q-feature reference vectors, the thresholds and any further thresholds generated by the method according to the first aspect of the invention.

Advantageously, the device further comprises a codebook processing unit adapted to carry out the steps of the method according to the first aspect of the invention and to store the (extended) sub-sets or (extended) further sub-sets, thresholds and any further thresholds generated by said method in the memory unit.

Advantageously, the device further comprises a conversion unit for converting an input speech signal into a digital speech data and to provide it to the feature extraction unit.

In a further aspect the present invention relates to a distributed speech recognition system comprising
- a user device according to the previous aspect of the invention;
- a recognition device for reconstructing the digital input data;
- a transmission channel for data transmission between the user device and the recognition device.

Advantageously, the user device is adapted to transmit to the recognition device the indexes of the reference vectors providing the lowest distortion with the input Q-feature vectors.

Advantageously, the distributed speech recognition system further comprises a codebook processing unit adapted to carry out the steps of the method according to the first aspect of the invention and to store the (extended) sub-sets or (extended) further sub-sets, thresholds and any further thresholds generated by said method in the memory unit.

BRIEF DESCRIPTION OF THE DRAWINGS

Characteristics and advantages of the invention shall now be illustrated with reference to embodiments represented as a non-limiting example in the attached drawings in which:

FIG. 3 shows an example of a table representing a codebook with N two-feature vectors;

DETAILED DESCRIPTION OF THE INVENTION

Figure 9:
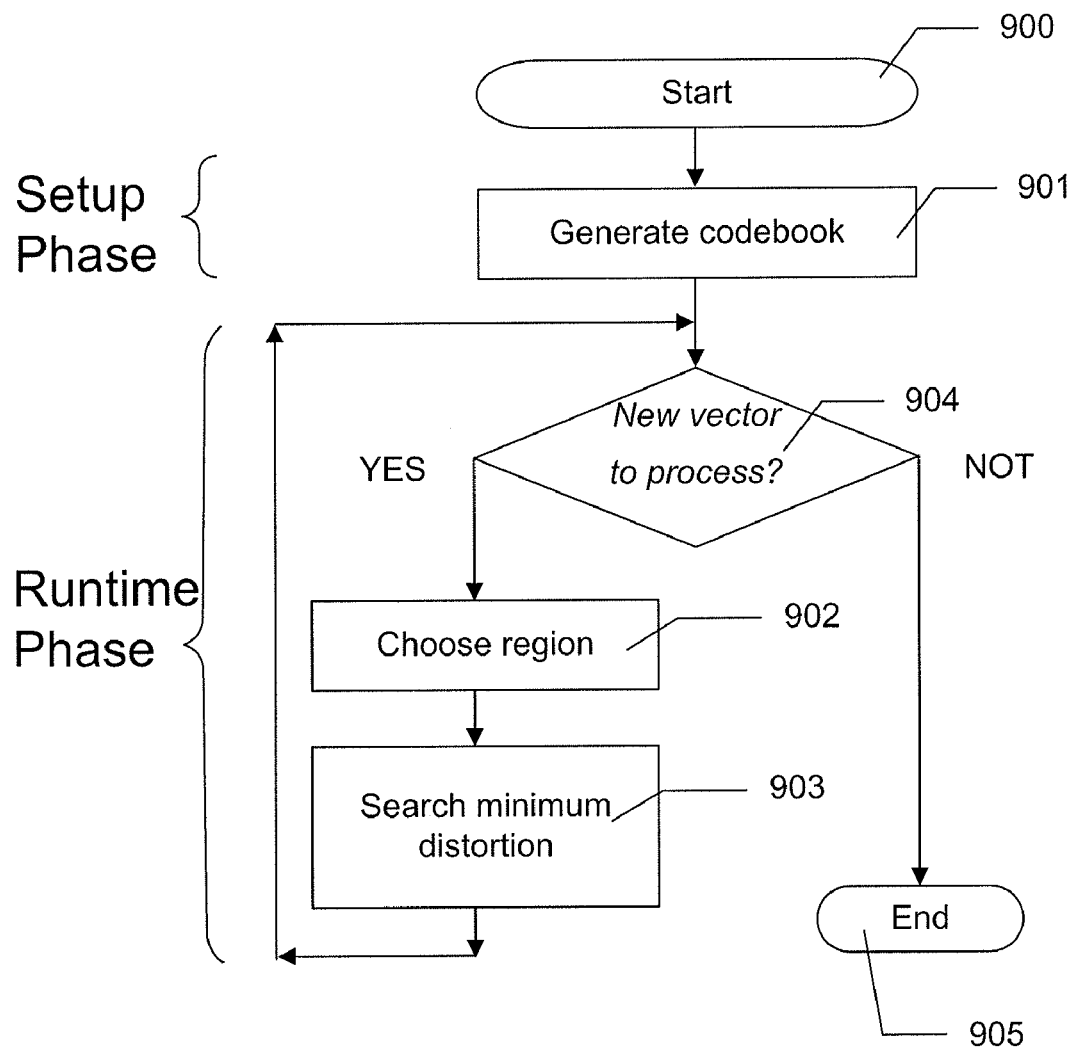
FIG. 9 shows a flow chart schematically describing a method for data compression according to the present invention.

FIG. 9 is a flow-chart representation of a method for data compression according to the present invention.

The method can be for instance used for the client side of a speech recognition system.

The method starts at block 900 and includes a set-up phase and a runtime phase.

The set-up phase includes a codebook generating step (or regions formatting step), represented by block 901, wherein a predetermined codebook is subdivided into predetermined regions.

The runtime phase is executed for each input feature vector and comprises a region choice step and a minimum-distortion search step (or a minimum-distortion search and mapping step), represented by blocks 902 and 903, respectively. In the region choice step, the region of the codebook including the codebook vector providing the minimum distortion to the input vector is identified. In the minimum-distortion search step, the codebook vector providing the minimum distortion to the input vector is found within the identified region and the input vector is mapped with the index of the identified codebook vector.

In block 904, it is checked if a new feature vector has to be processed. In the negative, the process ends (block 905).

The method of the present invention is herein below described in greater detail.

According to the method of the invention for generating a codebook providing low data compression computational effort, a codebook comprising a set of N reference vectors each having Q ordered features is processed so as to divide the codebook in predetermined regions, each comprising a subset of reference vectors, and to generate access information to the predetermined regions.

A codebook may be represented by a table comprising N rows and Q columns wherein each row represents a vector of the codebook.

According to this representation, a sub-table comprising Q columns and a subset of rows of the table represents a region of the codebook space which comprises a corresponding subset of codebook reference vectors.

The table is processed by means of iterative operations of subdivision and sorting of the rows of the table so as to provide predetermined sub-tables and information to access the sub-tables.

Figure 1:
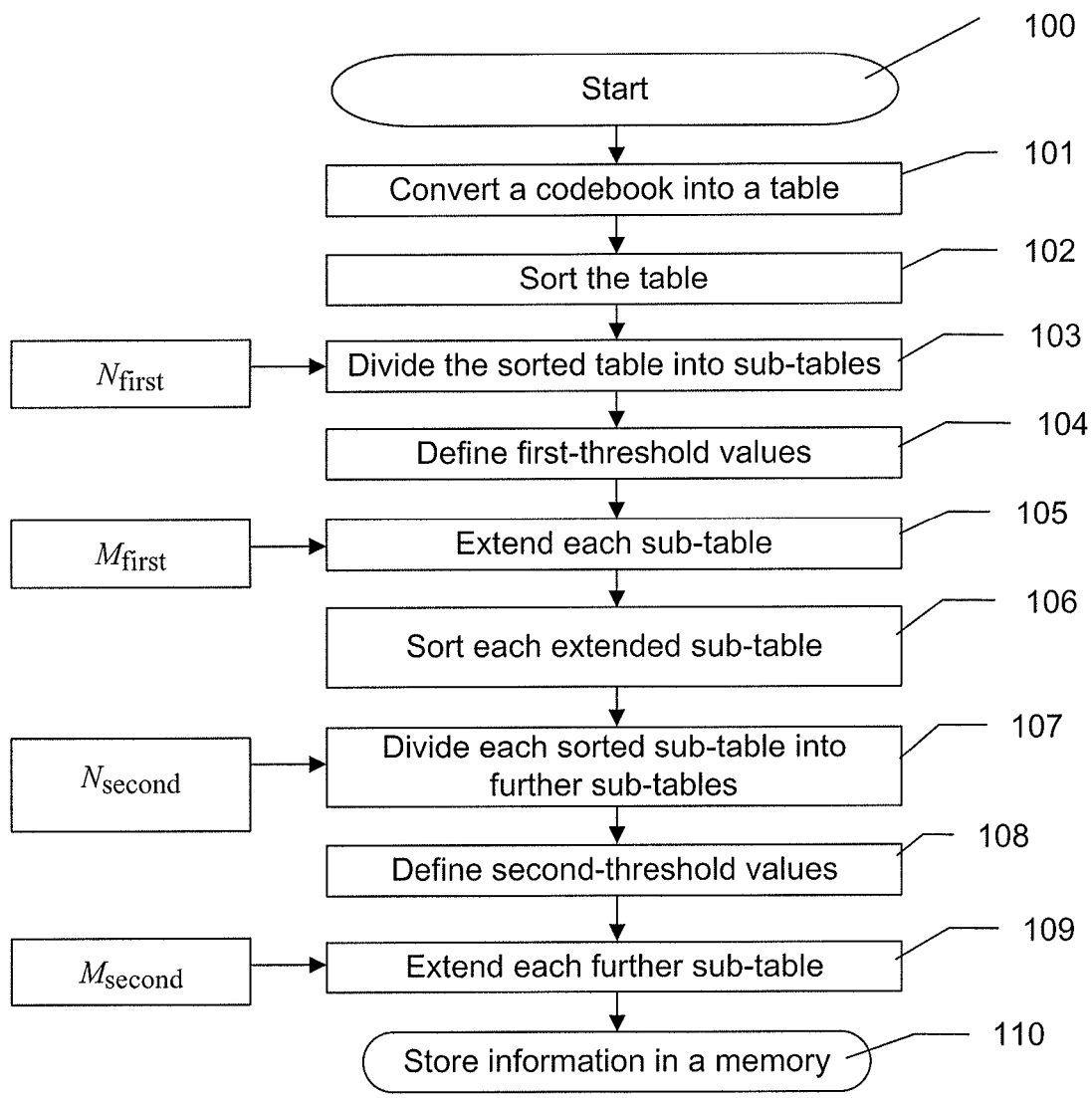
FIG. 1 shows a flow chart schematically describing the codebook generating method of the invention.

The flow chart of FIG. 1 schematically shows a preferred embodiment of the above-mentioned codebook generating step. This generating step is, in the illustrative example here considered, performed on a non-uniform codebook having N two-feature vectors (i.e., Q=2): $\{C_{1,A}; C_{1,B}\}$, $\{C_{2,A}; C_{2,B}\}$ ... $\{C_{N,A}; C_{N,B}\}$, wherein 1, 2 ... N denote the indexes of the reference vectors and A and B denote the first and second feature of the vectors, respectively.

Figure 2:
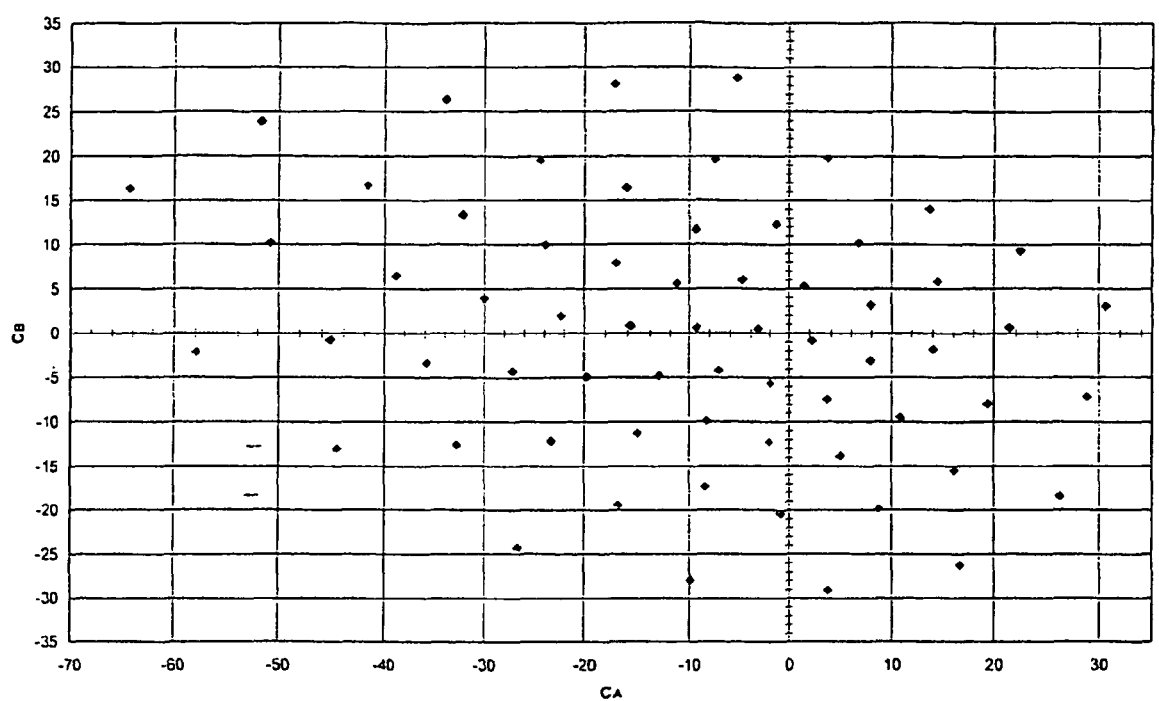
FIG. 2 shows an example of a non-uniform codebook comprising two-feature reference vectors.

FIG. 2 shows an example of a non-uniform bi-dimensional codebook comprising 64 reference vectors (i.e., Q=2 and N=64), specified by the ETSI "Aurora" standard for a DSR compression algorithm.

According to the flow chart of FIG. 1, the procedure starts at block 100 and the non-uniform codebook is converted in a table at block 101.

FIG. 3 shows an example of table formed at block 101 comprising the N two-feature vectors $\{C_{1,A}; C_{1,B}\}$, $\{C_{2,A}; C_{2,B}\}$ ... $\{C_{N,A}; C_{N,B}\}$.

At block 102 one of the two columns is chosen and all the vectors of the table are sorted row by row in ascending (or alternatively descending) order with respect to the feature values comprised in the chosen column, maintaining the correspondence between all the features of the vectors.

At block 103 the obtained sorted table of N rows is subdivided in $N_{first}$ 2-column sub-tables, preferably having a number of rows the most possible equal to each other, that is the most possible equal to $N/N_{first}$.

Of course, the $N_{first}$ sub-tables can have the same number of rows equal to $N/N_{first}$ when the remainder of the division $N/N_{first}$ is zero.

For the sake of simplicity, on the following description said remainder is assumed to be zero.

At block 104 $N_{first}$ first-threshold values are defined which identify the $N_{first}$ sub-tables obtained at block 103.

The $N_{first}$ first-thresholds can be set, for example, to a value included between the last value comprised in the chosen column of the corresponding sub-table and the first value comprised in the chosen column of next sub-table, if any. Preferably, the $N_{first}$ first-thresholds are set equal to the last value comprised in the chosen column of corresponding sub-tables.

At block 105 each sub-table is preferably extended by adding to the top and/or to the bottom thereof. $M_{first}$ rows corresponding to the $M_{first}$ rows (if any) that in the sorted table precede and follow such sub-table, with $M_{first} \leq N/N_{first}$. Extended sub-tables comprising $P_{first,i}$ rows are thus provided, where $P_{first,i}$ can assume the following values:

$P_{first,1} = (N/N_{first}) + M_{first}$ for the top and the bottom extended sub-table of the table;

$P_{first,2} = (N/N_{first}) + 2 \cdot M_{first}$ for all the other central extended sub-tables of the table.

At block 106 the vectors of each extended sub-table are sorted in ascending (or descending) order with respect to the feature values comprised in the other column, independently of the order previously used at block 102 and maintaining the correspondence between all the features of the vectors.

At block 107 each sorted extended sub-table with $P_{first,i}$ rows is subdivided in $N_{second}$ two-column further sub-tables, so that the number of rows in the further sub-tables is $P_{first,i}/N_{second}$. Due to their lower dimension, the top and bottom extended sub-tables will have a lower number of rows than the other extended sub-tables.

Of course, the $N_{second}$ further sub-tables obtained from each extended sub-table can have the same number of rows equal to $P_{first,i}/N_{second}$ when the remainder of the division $P_{first,i}/N_{second}$ is zero.

For the sake of simplicity, on the following description said remainder is assumed to be zero.

At block 108 $N_{second}$ second-threshold values are defined which identify the $N_{second}$ further sub-tables obtained at block 107 for each of the $N_{first}$ extended sub-tables.

Therefore, a total of $N_{first} \cdot (N_{second})$ threshold values are provided.

The $N_{second}$ second-thresholds can, for example, be defined with the same criterion disclosed above to define the first-thresholds.

At block 109 each further sub-table of dimension $P_{first,i}/N_{second}$ is preferably extended by adding to the top and/or to the bottom thereof. $M_{second}$ rows corresponding to the $M_{second}$ rows (if any) that, in the corresponding sorted extended sub-table, precede and follow such further sub-table, with $M_{second} < (P_{first,i}/N_{second})$. Extended further sub-tables comprising $P_{second,j}$ rows are thus provided, where $P_{second,j}$ can assume the following distinct values:

$P_{second,1} = (P_{first,1}/N_{second}) + M_{second}$ for the top and the bottom extended further sub-table of the top and the bottom extended sub-table;

$P_{second,2} = (P_{first,1}/N_{second}) + 2 \cdot M_{second}$ for all the other central extended further sub-tables of the top and the bottom extended sub-table;

$P_{second,3} = (P_{first,2}/N_{second}) + M_{second}$ for the top and the bottom extended further sub-table of all the other central extended sub-tables;

$P_{second,4} = (P_{first,2}/N_{second}) + 2 \cdot M_{second}$ for all the other central extended further sub-tables of all the other central extended sub-tables.

At block 110 the generated extended sub-tables and the first and second threshold values are stored in a memory so that they can be subsequently used in a vector compression method.

It is noted that the extension steps carried out at blocks 105 and 109 are preferred (not necessary) steps of the codebook generating method of the invention which—by providing an overlapping between sub-tables and further sub-tables—allow error in vector compression to be highly reduced also for input vectors located near the border of adjacent regions of the codebook which are represented by said (further) sub-tables.

Once a given codebook has been generated according to the method of the invention, vector compression can be performed every time a new input vector is received by replacing the input vector with the index of the reference vector that, within said given codebook, offers the minimum distortion.

More in particular, the vector compression method according to the invention comprises the two above-mentioned procedures of region choice and minimum distortion search.

Figure 4:
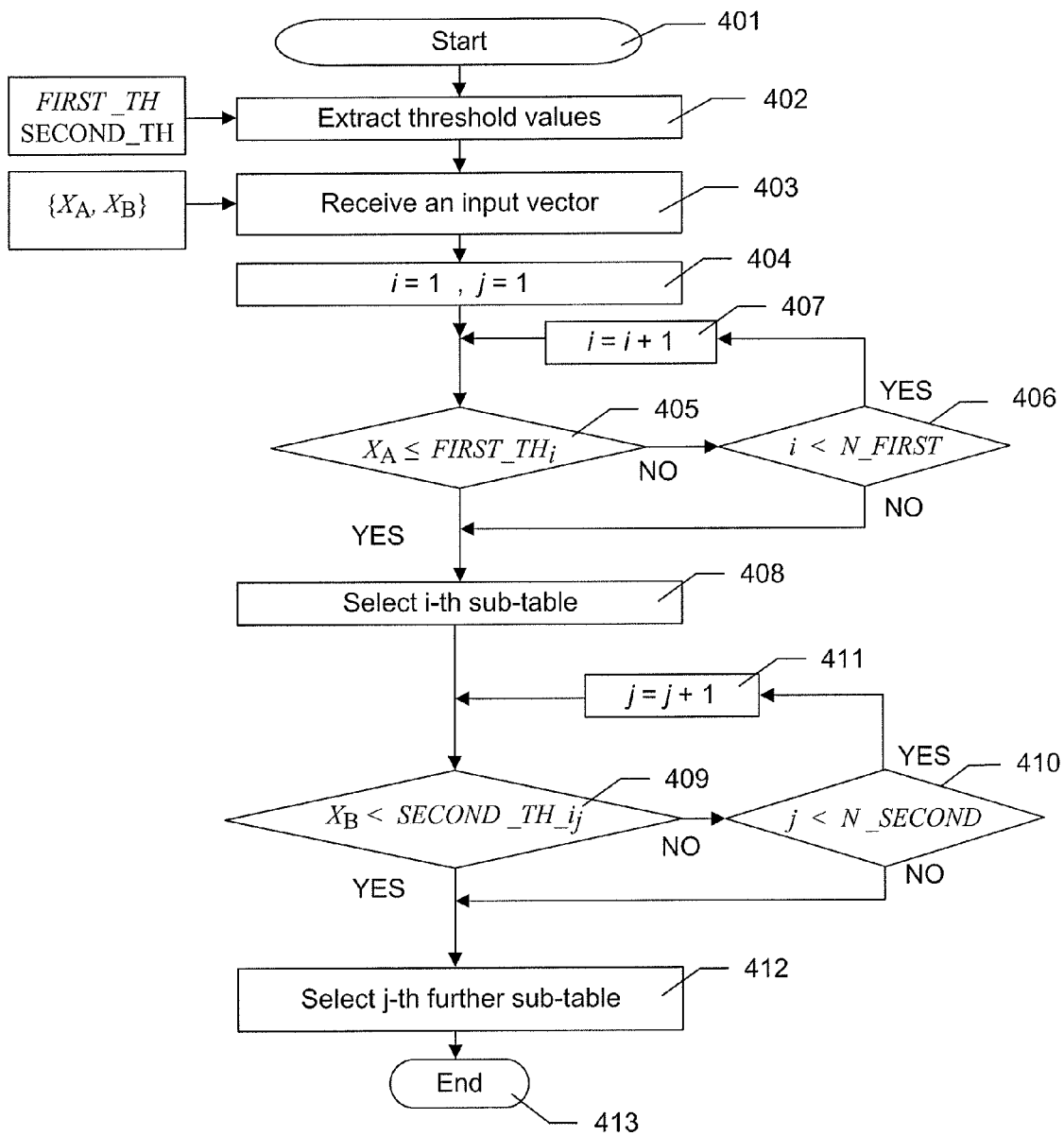
FIG. 4 shows a flow chart schematically describing a preferred embodiment of a region choice procedure according to the invention.

The flow chart of FIG. 4 schematically shows a preferred embodiment of the region choice procedure for a two-feature input vector $\{X_A, X_B\}$ and a bi-dimensional codebook processed according to what disclosed with reference to FIG. 1.

At block 401 the procedure starts, the $N_{first}$ first-threshold and $N_{second}$ second-threshold values are extracted from a memory (block 402) and a new input vector $\{X_A, X_B\}$ is received (block 403).

At block 404 parameters i and j are initialised to 1.

At block 405 the $X_A$ feature of the input vector is compared with the i-th first threshold value (FIRST_TH$_i$). If $X_A \leq$ FIRST_TH$_i$ then the i-th sub-table is selected at block 408. If $X_A >$ FIRST_TH$_i$ then the i parameter is compared with $N_{first}$ at block 406. If i<$N_{first}$ then i is incremented by 1 (i=i+1) at block 407 and block 405 is returned to; else the i-th sub-table is selected at block 408.

In other words, at blocks 405 to 408 the first feature (i.e. $X_A$) of the input vector $\{X_A, X_B\}$ is progressively compared with the $N_{first}$ first-threshold values in order to identify the sub-table wherein the input vector is contained.

Then, at blocks 409 to 412 the second feature (i.e. $X_B$) of the input vector $\{X_A, X_B\}$ is progressively compared with the $N_{second}$ second-threshold values in order to identify the further sub-table, within the i-th sub-table selected at block 408, wherein the input vector is contained.

More in particular, at block 409 the $X_B$ feature of the input vector is compared with the j-th second threshold value (SECOND_TH_i$_j$). If $X_B \leq$ SECOND_TH_i$_j$ then at block 412 the j-th further sub-table of the i-th sub-table selected at block 408 is selected. If $X_B >$ SECOND_TH_i$_j$ then j parameter is compared with $N_{second}$ at block 410. If j<$N_{second}$ then j is incremented by 1 (j=j+1) at block 411 and block 409 is returned to; else at block 412 the j-th further sub-table of the i-th sub-table selected at block 408 is selected. At block 413 the procedure ends.

The embodiment shown in FIG. 4 assumes that the sorting performed at blocks 102 and 106 of the codebook generating method was performed in ascending order. When a descending order in block 102 and/or block 106 is used, at block 405 and/or block 409 the feature $X_A$ and/or $X_B$ will be checked to be greater than (instead of lower than) the thresholds.

Moreover, the embodiment shown in FIG. 4—wherein the first feature $X_A$ of the input vector is progressively compared with the first threshold values and the second feature $X_B$ of the input vector is progressively compared with the second threshold values—assumes that in the codebook generating method the first threshold values were associated with respect to the first column of the table and the second threshold values with respect to the second column.

However, in general, it is noted that when a set of threshold values is defined with respect to a q-th column of the codebook table, then the q-th feature of the input vector is the one which is progressively compared with said set of threshold values.

Figure 10:
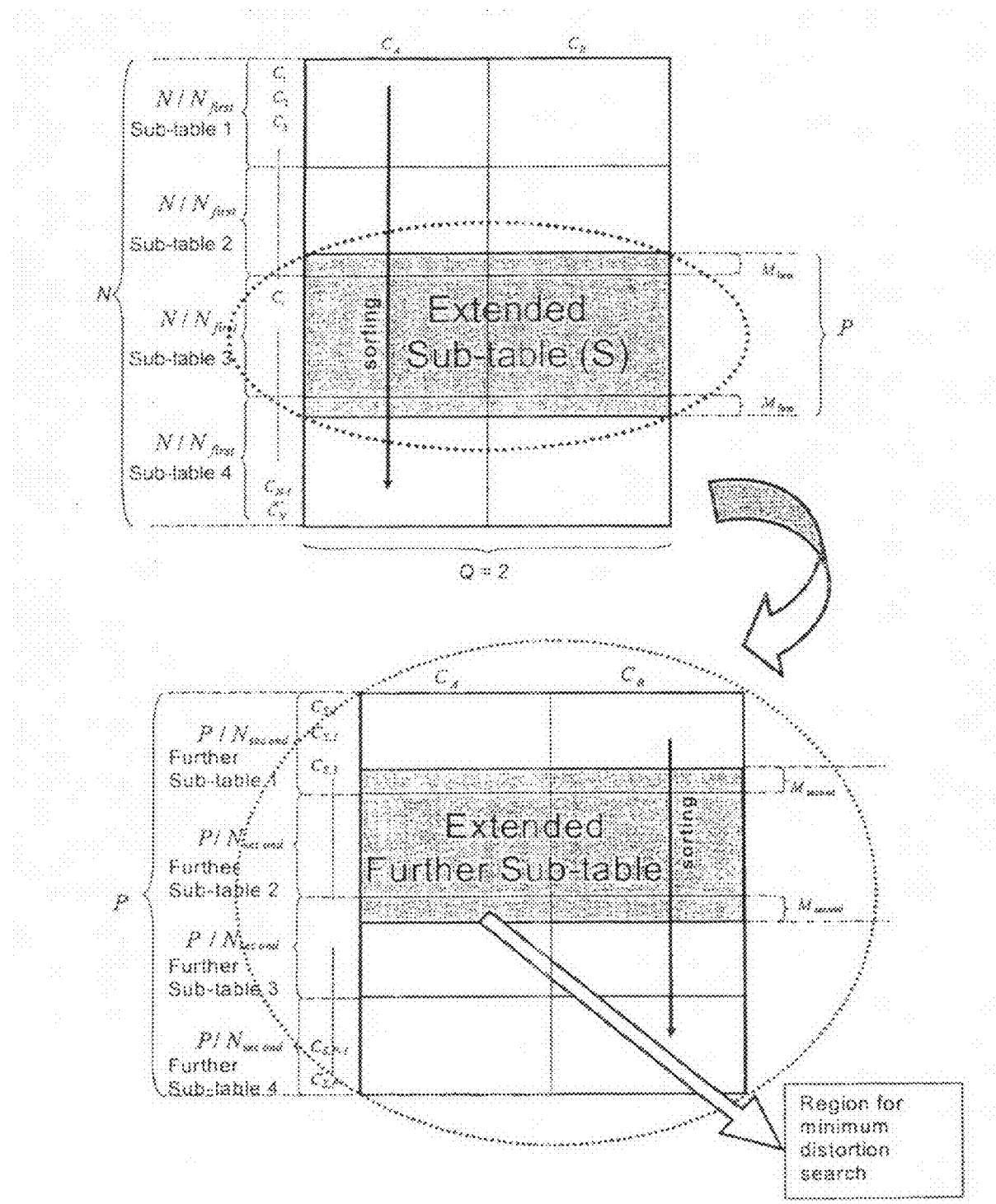
FIG. 10 schematically represents the region choice procedure according to the invention performed on a bi-dimensional table.

FIG. 10 schematically represents the region choice procedure according to the invention performed for a two-feature input vector and a bi-dimensional codebook represented by a bi-dimensional table having a first column $C_A$ and a second column $C_B$. In the example shown the second extended further sub-table of the third extended sub-table S has been identified by the region choice procedure for the minimum distortion search procedure.

Figure 5:
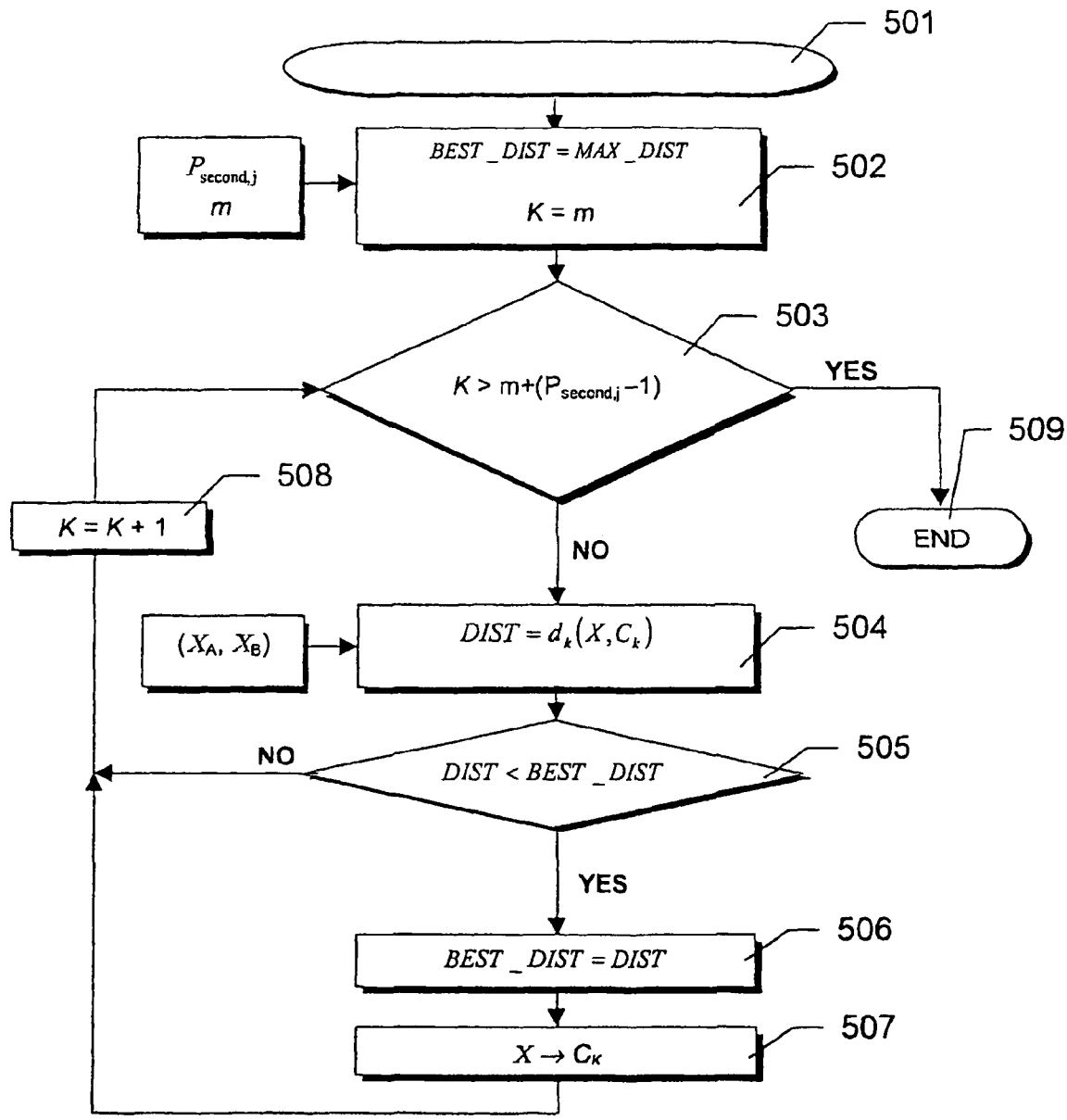
FIG. 5 shows a flow chart schematically describing a preferred embodiment of a minimum distortion search procedure according to the invention.

The flow chart of FIG. 5 schematically shows a preferred embodiment of the minimum distortion search procedure, wherein the minimum distortion is computed by identifying the reference vector which has the minimum distance from the input vector.

According to this procedure, the minimum distance reference vector is searched for within the j-th extended further sub-table of the i-th sub-table selected at block 412 of the region choice procedure. The received input vector is then mapped with the index of the identified reference vector.

More in particular, at block 501 the procedure starts.

At block 502 a parameter BEST_DIST is initialised to the value MAX_DIST, which is a value equal to, or greater than, the maximum distance between two points of the considered codebook; a parameter k is initialised to a value m equal to the index of the first reference vector comprised in the extended further sub-table selected at block 412 of the region choice procedure; and the number of rows $P_{second,j}$ of said extended further sub-table is loaded.

Block 503 checks if all the $P_{second,j}$ reference vectors $\{C_{K,A}, C_{K,B}\}$ of the extended further sub-table selected at block 412 have been processed. That is, it checks if k is higher than $m+(P_{second,j}-1)$.

In the affirmative case, the procedure ends (block 509). In the negative case at block 504 the distance DIST between the input vector $\{X_A, X_B\}$ and the current reference vector $\{C_{K,A}, C_{K,B}\}$ is computed.

At block 505 a comparison between the computed distance DIST and the BEST_DIST parameter is performed. If DIST<BEST_DIST then the parameter BEST_DIST is set equal to the computed distance DIST at block 506, else the parameter k is incremented by 1 (k=k+1) at block 508 and block 503 is returned to.

At block 507 the received vector $\{X_A, X_B\}$ is replaced by the index of the current reference vector $\{C_{K,A}, C_{K,B}\}$ and block 508 is returned to.

According to the invention, the minimum distortion search procedure is performed within an extended further sub-table containing a number of elements equal to $P_{second,j}$.

The minimum distortion search procedure may be performed for example by means of (weighted) Euclidean distance computation.

The worst case in terms of maximum number of distance computations (DNM) takes place when the input vector is located in a central further sub-table obtained from a central sub-table of the table. In fact, in this case both the further sub-table and the corresponding sub-table are extended at the top and at the bottom.

In particular, in the worst case the maximum number of distance computations performed by block 504 is given by:

$$DNM = P_{second,4} = (P_{first,2}/N_{second}) + 2 \cdot M_{second}$$

wherein $$P_{first,2} = (N/N_{first}) + 2 \cdot M_{first}$$

Therefore, the maximum number of distance computations (DNM) is given by:

$$DNM = \frac{(N/N_{first}) + 2 \cdot M_{first}}{N_{second}} + 2 \cdot M_{second} = \frac{N}{N_{first} \cdot N_{second}} + \frac{2 \cdot M_{first}}{N_{second}} + 2 \cdot M_{second} \ll N$$

By way of an example, a non-uniform codebook of 64 two-reference vectors (N=64, Q=2) is considered. The correspondent codebook table having 64 rows and 2 columns is for example subdivided by 4 ($N_{first}$=4). Four sub-tables having (N/$N_{first}$)=64/4=16 rows are obtained. The sub-tables are then extended by 8 rows ($M_{first}$=8). In this way, the number of rows of the extended sub-tables is the following:

$P^{(1)}=P^{(4)}=P_{first,1}=(N/N_{first})+M_{first}=24$ for the first and the last (top and bottom) extended sub-table.

$P^{(2)}=P^{(3)}=P_{first,2}=(N/N_{first})+2 \cdot M_{first}=32$ for the central extended sub-tables.

Each extended sub-table is then subdivided in 4 further-sub-tables ($N_{second}$=4), thereby obtaining a total number further sub-tables equal to $N_{first} \cdot N_{second}$=4·4=16 having the following number of rows:

$P_{first,1}/N_{second}$=24/4=6 for the further sub-tables obtained from the first and the last sub-table.

$P_{first,2}/N_{second}$=32/4=8 for all the other further sub-tables.

The further sub-tables are then extended by 3 rows ($M_{second}$=3). In this way, the number of rows of the extended further sub-tables is the following:

$P^{(1,1)}=P^{(1,4)}=P^{(4,1)}=P^{(4,4)}=(P_{first,1}/N_{second})+M_{second}=9$ for the first and the last extended further sub-table relative to the first and the last extended sub-table;

$P^{(1,2)}=P^{(1,3)}=P^{(4,2)}=P^{(4,3)}=(P_{first,1}/N_{second})+2 \cdot M_{second}=12$ for all the other central extended further sub-tables relative to the first and the last extended sub-table;

$P^{(2,1)}=P^{(2,4)}=P^{(3,1)}=P^{(3,4)}=(P_{first,2}/N_{second})+M_{second}=11$ for the first and the last extended further sub-table relative to the central extended sub-tables.

$P^{(2,2)}=P^{(2,3)}=P^{(3,2)}=P^{(3,3)}=(P_{first,2}N_{second})+2M_{second}=14$ for all the other central extended further sub-tables relative to the central extended sub-tables.

In this example a maximum number of distance computation DNM equal to 14 has been obtained. This value can be obtained by means of the above mentioned relationship as follows:

$$DNM = \frac{N}{N_{first} \cdot N_{second}} + \frac{2 \cdot M_{first}}{N_{second}} + 2 \cdot M_{second} = \frac{64}{4 \cdot 4} + \frac{2 \cdot 8}{4} + 2 \cdot 3 = 14 \ll 64$$

Accordingly, the maximum number of distance computations to be performed according to the invention is lower than the number of distance computations (equal to N) which has to be performed with the conventional ETSI compression algorithm (exhaustive computation).

It is further noted that while in the codebook generating method of the invention the thresholds are associated with the sub-tables and further sub-tables the minimum distortion search procedure is preferably performed within an extended further sub-tables. This advantageously allows error in vector compression to be reduced even when an input vector is located near the border of the codebook region represented by said further sub-table.

As to the selection of the above mentioned parameters $N_{first}$, $M_{first}$, $N_{second}$ and $M_{second}$ to be used in the codebook generating method of the invention, it can be carried out, for example, by a subsequent approximation procedure. That is, they can be selected by first using sub-tables (further sub-tables) having a large number of rows, testing the results on the vector compression method for a given set of input vectors (e.g. obtained from an application or randomly generated), and then by progressively reducing the number of rows of the sub-tables (further sub-tables) until the compression method gives errors below an acceptable preselected threshold, depending on the application.

On this purpose, it is noted that the above mentioned parameters can be selected with high flexibility. In fact, the various sub-tables can have a number of rows different from each other and/or can be extended by a different number of rows (e.g., different $M_{first}$ for each sub-table). Analogously, the various further sub-tables can have a number of rows different from each other and/or can be extended by a different number of rows (e.g., different $M_{second}$ for each further sub-table). For example, the parameters can be advantageously selected in order to obtain further-sub-tables having almost the same number of rows even in case of non-uniform codebook with an odd number of reference vectors or a not power of two number of reference vectors.

The Applicant found a method for optimising the selection procedure of the above mentioned parameters in terms of complexity and precision of the minimum distortion search procedure.

The proposed method aims at generating regions inside the non-uniform codebook space comprising almost the same number of reference vectors (i.e. extended further sub-tables of the codebook table having almost the same number of rows) so that the computational effort required to the minimum distortion search procedure is about the same for all the received input vectors, independently from the regions wherein they are contained. In this way, a non-uniform codebook space is divided in regions of different dimensions but with approximately the same number of points.

In the proposed optimisation method the following conditions are imposed:
 the table and each extended sub-table are divided respectively in sub-tables and further sub-tables comprising approximately (considering that extremity (further) sub-tables have lower dimension being extended only on one side) the same number of rows (equal to $N/N_{first}$ and $P_{first,i}/N_{second}$, respectively);
 the sub-tables are extended by the same number of rows $M_{first}$ and the further sub-tables are extended by the same number of rows $M_{second}$;
 the number N of reference vectors is equal to a power of two: $N=2^n$. If the number of reference vectors in a codebook is not a power of two, a number of rows can be added to the bottom or to the top of the table comprising dummy reference vectors (for example set equal to the lowest or highest vector of the codebook) so as to obtain a number of rows equal to a power of two. Dummy vectors are then excluded from the execution of the minimum distortion search procedure. It is noted that the codebooks defined by the above mentioned "AURORA" ETSI standard all have a number N of reference vectors which is a power of two;
 $N_{first}$ is a power of two: $N_{first}=2^r$;
 the maximum value of $M_{first}$ is $N/N_{first}$;
 the maximum value of $N_{second}$ is $P_{first,1}$;
 $N_{second}$ is a power of two: $N_{second}=2^t$;
 the maximum value of $M_{second}$ is $P_{first,1}/N_{second}$;

the following relations must be satisfied:

$$\begin{cases} P_{first,1} \bmod N_{second} = 0 \\ P_{first,2} \bmod N_{second} = 0 \end{cases}$$

where, r, s, t, u are non-negative integers and mod is the modulo operator (i.e., "x mod y" is the remainder of the division "x/y").

Figure 6:
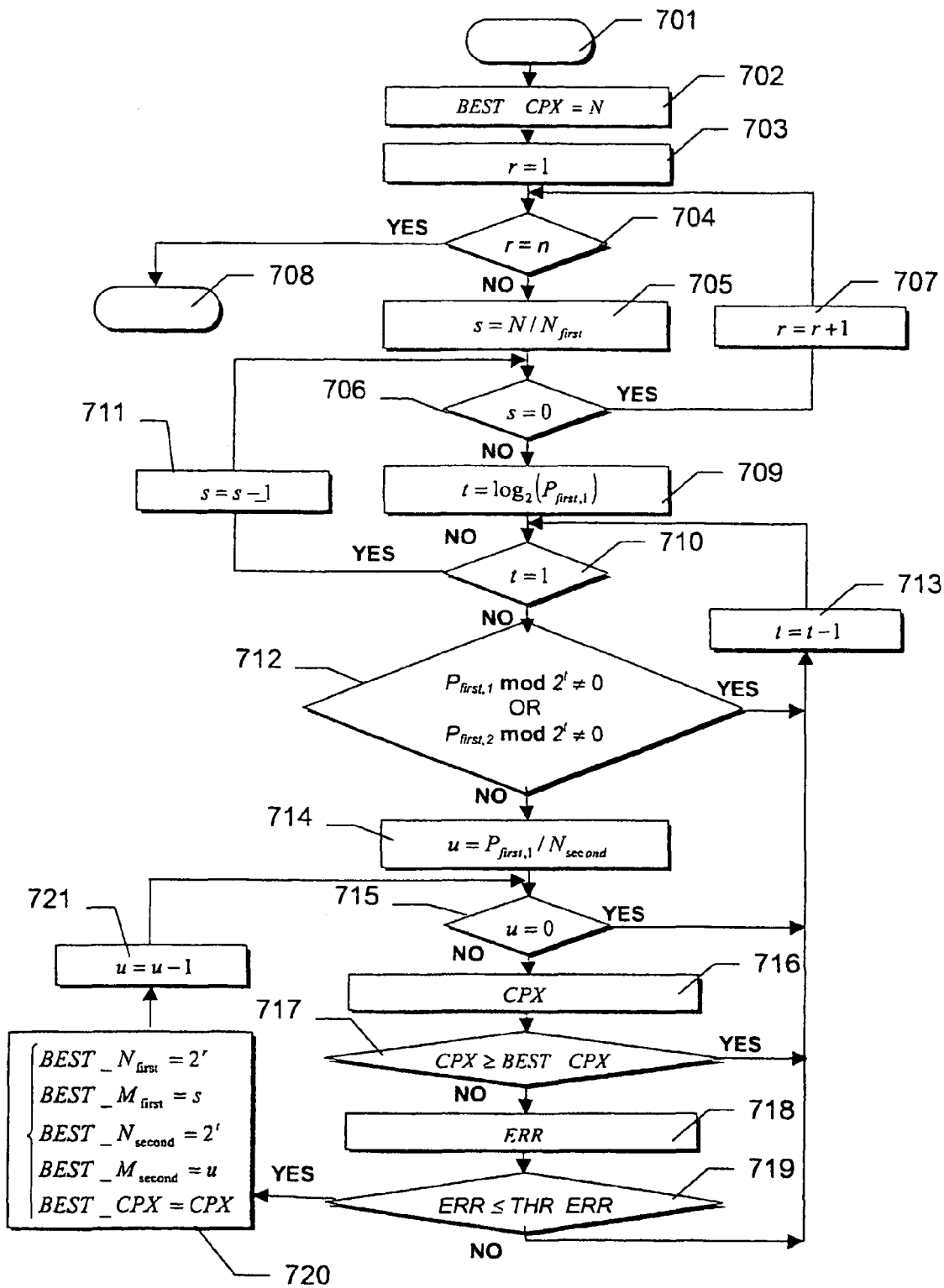
FIG. 6 shows a flow chart schematically describing a preferred embodiment of a parameter optimising procedure which computes an optimal set of values for the parameters $N_{first}$, $M_{first}$, $N_{second}$, $M_{second}$ to be used in the codebook generating method of the invention.

The flow chart of FIG. 6 schematically shows a preferred embodiment of the parameter optimising method which computes an optimal set of values $BEST\_N_{first}$, $BEST\_M_{first}$, $BEST\_N_{second}$, $BEST\_M_{second}$ by verifying that the above mentioned conditions are met and that the final solution corresponds to a minimum of a complexity function CPX (defined below) and gives an error below a predefined threshold THR_ERR (eventually set to zero).

According to the flow chart of FIG. 6, four nested loops are executed.

At block 701 the procedure starts.

At block 702 the parameter BEST_CPX is initialised to N (worst case for the complexity function CPX).

At block 703 the parameter r is initialised to 1 (i.e. $BEST\_N_{first}=2^r=2$) and the outermost first loop—aiming at setting the parameter $BEST\_N_{first}$—begins.

At block 704 the r parameter value is compared to n. If r=n (i.e., $BEST\_N_{first}=2=N$), the optimisation procedure ends at block 708. If r≠n, block 705 is executed.

At block 705 the parameter s is initialised to $N/N_{first}$ (i.e. $BEST\_M_{first}=N/N_{first}$) and the second loop—aiming at setting the parameter $BEST\_M_{first}$—begins.

At block 706 the s parameter value is compared to zero. If s=0 (i.e., $BEST\_M_{first}=0$), then the parameter r is increased by 1 (r=r+1) at block 707 and block 704 is returned to. If s≠0, parameter t is set equal to $\log_2(P_{first,1})$ at block 709 and the third loop—aiming at setting the parameter $BEST\_N_{second}$—begins.

At block 710 the t parameter value is compared to 1. If t=1 (i.e., $BEST\_N_{second}=2^t=1$), then the parameter s is decreased by 1 (s=s−1) at block 711 and block 706 is returned to. If t≠1, the following conditions are checked at block 712: $P_{first,1}$ mod $N_{second}$≠0; $P_{first,2}$ mod $N_{second}$≠0. If one of said conditions is met, then the parameter t is decreased by 1 (t=t−1) at block 713 and block 710 is returned to. If none of said conditions is met, parameter u is set equal to $P_{first,1}/N_{second}$ (i.e., $BEST\_M_{second}=P_{first,1}/N_{second}$) at block 714 and the fourth loop—aiming at setting the parameter $BEST\_M_{second}$—begins.

At block 715 the u parameter value is compared to zero. If u=0 (i.e., $BEST\_M_{second}=0$), then the parameter t is decreased by 1 (t=t−1) at block 713 and block 710 is returned to. If u≠1, the complexity function CPX is computed at block 716.

The complexity function CPX represents the number of distance computation which has to be performed runtime to find the minimum distortion reference vector by the minimum distortion search procedure. For example, the complexity function is defined as the mean number of reference vectors contained inside each region (each extended further sub- -table), computed considering all the regions (all the extended further sub-tables) in which the codebook is divided, that is:

$$CPX = \frac{\sum_{i=1}^{N_{first}} \sum_{j=1}^{N_{second}} P^{(i,j)}}{N_{first} \cdot N_{second}}$$

At block 717 the CPX value computed at block 716 is compared to BEST_CPX parameter. If CPX≧BEST_CPX, then the parameter t is decreased by 1 (t=t−1) at block 713 and block 710 is returned to. If CPX<BEST_CPX, then the error parameter ERR is computed at block 718.

At block 719 the ERR value computed at block 718 is compared to THR_ERR. If ERR>THR_ERR, then the parameter t is decreased by 1 (t=t−1) at block 713 and block 710 is returned to. If ERR≦THR_ERR, then the parameters BEST_$N_{first}$, BEST_$M_{first}$, BEST_$N_{second}$, BEST_$M_{second}$, BEST_CPX are set equal to $2^r$, s, $2^t$, u and CPX, respectively, at block 720. Then, at block 721, the parameter u is decreased by 1 (u=u−1) and block 715 is returned to. It is noted that the error parameter ERR is computed at block 718 only if CPX<BEST_CPX. That is, it is computed only if a new local minimum of the complexity function CPX has been found using the value of the parameters BEST_$N_{first}$, BEST_$M_{first}$, BEST_$N_{second}$, BEST_$M_{second}$, BEST_CPX set at the last execution of block 720. This advantageously reduces the number of computations of the optimisation procedure.

The error parameter ERR at block 718 can be obtained by carrying out the minimum distortion search procedure according to the invention on a set of input vectors (application dependent or randomly generated) and comparing the results thus obtained with those obtained by a conventional exhaustive computation algorithm.

The threshold THR_ERR used at block 719 is predefined by a user, depends on the applications and can be set also to zero.

It is noted that in the embodiment shown in FIG. 6, the outermost loop aiming at setting the parameter $N_{first}$ and starting at block 704, is executed for $N_{first}$ varying from the minimum value 2 to the maximum value N. The parameter optimisation procedure is thus firstly checked with low values of $N_{first}$ which advantageously allow a less number of sub-tables to be formed in the codebook generating method of the invention and thus a reduced number of sub-tables to be stored.

As to the loop aiming at setting the parameter $M_{first}$ and starting at block 705, it is executed for $M_{first}$ varying from the maximum value N/$N_{first}$ to the minimum value 0. The parameter optimisation procedure is thus carried out by checking the complexity from the highest value to the lowest.

As to the loop aiming at setting the parameter $N_{second}$ and starting at block 709, it is executed for $N_{second}$ varying from the maximum value $P_{first,1}$ to the minimum value 2. In this way, the parameter optimisation procedure is firstly checked for high values of $N_{second}$ which advantageously allow a higher number of further sub-tables, with a reduced number of reference vectors, to be formed in the codebook generating method of the invention thereby reducing the complexity function.

As to the loop aiming at setting the parameter $M_{second}$ and starting at block 714, it is executed for $M_{second}$ varying from the maximum value $P_{first,1}$/$N_{second}$ to the minimum value 0. In this way, if the ERR parameter is not lower than the threshold THR_ERR with a current value of $M_{second}$, then the lower values of $M_{second}$ are not checked and the procedure is repeated with another value of $N_{second}$. This advantageously allows the computations of the optimisation procedure to be reduced.

Even if the parameter optimisation procedure has been explained with reference to a bi-dimensional codebook (Q=2), it can also be extended to the case of a Q-dimensional codebook, with Q>2, in such a way that will be clear to a skilled in the art from the above description of the bi-dimensional case.

It is noted that, as the codebook generating method of the invention, also the parameter optimisation procedure of the invention can be executed off-line, only once for a given codebook.

It is also noted that the parameter optimisation procedure can be used not only for selecting, for a predetermined application, optimal values of the $N_{first}$, $M_{first}$, $N_{second}$ and $M_{second}$ parameters for the codebook given for said application but also for selecting new optimal values of said parameters when, for any reason, the codebook given for said application changes.

The codebook generating method and compression method of the invention have been described above, with reference to the flow charts of FIGS. 1, 4 and 5, for a bi-dimensional codebook (Q=2). However, the methods of the invention also apply to a Q-dimensional codebook comprising N rows and Q columns, with Q higher than 2.

Figure 7:
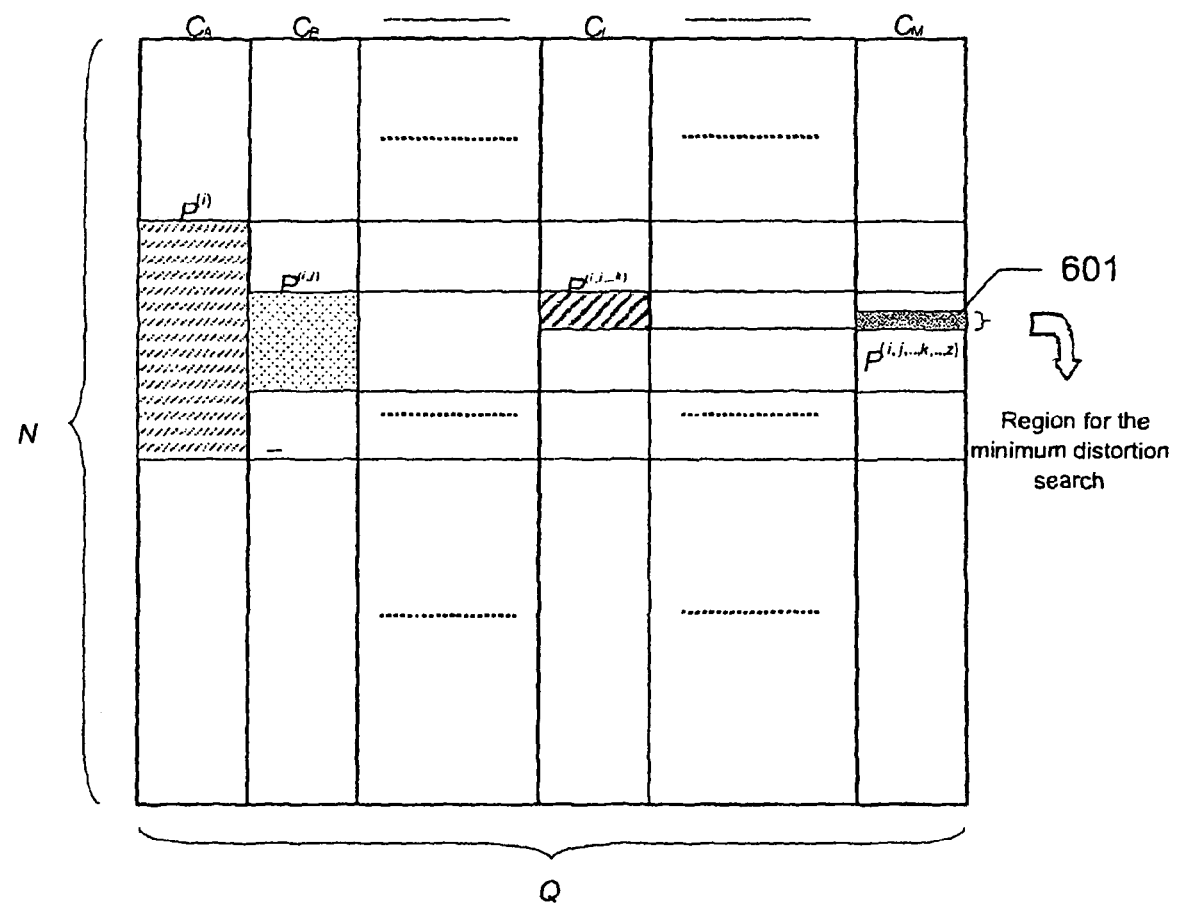
FIG. 7 schematically shows a Q-dimensional table processed according to the codebook generating method of the invention.

In this case, the sorting, subdivision and extension steps of the codebook generating method disclosed for a two-column codebook table can be executed iteratively for each column of a Q-column codebook table, as schematically shown in FIG. 7.

In particular, the following steps have to be advantageously repeated for each column of the codebook table:
  sorting the rows of the table—or of each (extended) sub-table obtained in the previous cycle—in ascending or descending order with respect to the feature values comprised in the currently considered column;
  subdividing the table—or each (extended) sub-table obtained in the previous cycle—in a predetermined number of sub-tables;
  associating a threshold with each sub-table for the currently considered column;
  optionally extending each sub-table by a predetermined number of rows thereby generating extended sub-tables to be processed in next cycle, considering another column of the table, if any.

The generated (extended) sub-tables or (extended) further sub-tables and all the generated thresholds are then stored in a memory so that they can be subsequently used in a region choice procedure and a minimum distortion search procedure similar to that disclosed above.

In general, it is noted that only the (extended) sub-tables or (extended) further sub-tables generated by the last execution of the above mentioned steps can be stored in the memory.

When the extension steps are not carried out, this corresponds to store in the memory the table with the reference vectors sorted as it results from the last execution of the above mentioned steps.

Indeed, when the extension steps are carried out, it is advantageous to store in the memory the extended (further) sub-tables generated by the subdivision and extension steps carried out with respect to the last but one considered column and sorted with respect to the last column. The extended further sub-tables generated by the sorting, subdivision and extension steps carried out with respect to the last considered column (to be used in the region choice procedure and minimum distortion search procedure) can then be accessed by suitable pointers.

As the extended (further) sub-tables generated by the subdivision and extension steps carried out with respect to the last but one considered column comprise, as a whole, a lower number of reference vectors with respect to the further sub-tables generated by the sorting, subdivision and extension steps carried out with respect to the last considered column, this allows to save memory space.

In FIG. 7 the shaded rectangles represent an example of (extended) sub-tables which can be progressively identified for a received input vector with a region choice procedure similar to that disclosed with reference to FIG. 4.

As clear from FIG. 7, the more the columns of the codebook table the less the number of distance computations that have to be computed within the finally selected sub-table 601 by the minimum distortion search procedure.

Indeed, in the example shown, the shaded extended sub-tables have a decreasing number of rows from the first column to the last column. As the sub-table used to apply the minimum distortion search procedure is in the last column, the present invention allows the computational effort required for feature vectors compression to be increasy reduced with an increasing number of columns.

The codebook generating method, the region choice procedure, the minimum distortion search procedure and the parameter optimisation procedure according to the invention can be executed by an electronic processing system such as a Personal Computer, an embedded device or a computer network by means of a suitable hardware, firmware and/or software implementation.

Said implementations will be designed according to principles that will be apparent to the skilled in the art from the present description and without departing from the scope of the invention.

The methods of the invention can be used any time data compression is needed for transmitting or storing information in a more compact format. For example, they can be used for image signal compression in an image processing system or speech signal compression in a distributed speech recognition system.

Figure 8:
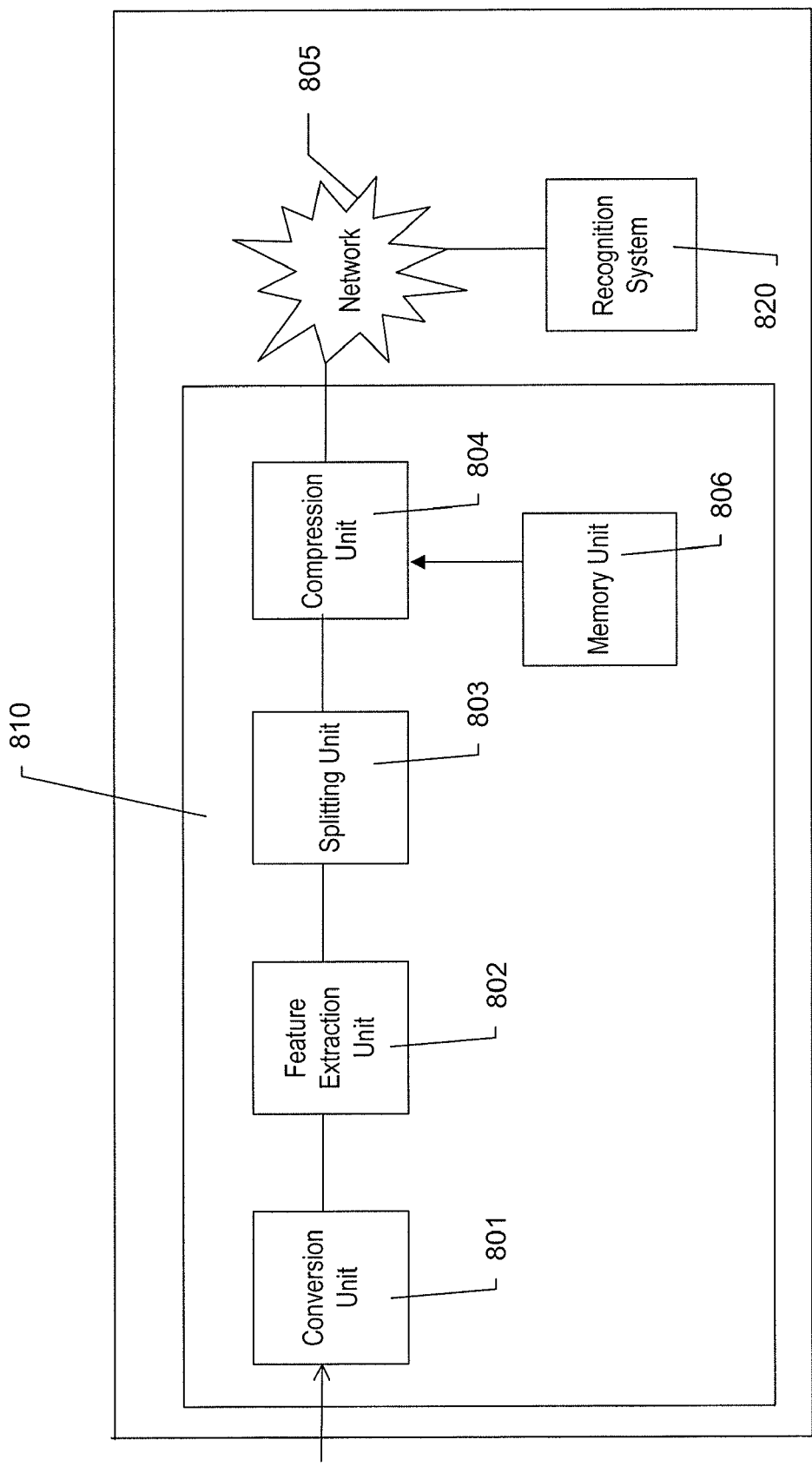
FIG. 8 schematically shows a DSR system according to an embodiment of the invention.

By way of an example, FIG. 8 shows a block diagram of an embodiment of a distributed speech recognition system 800 implemented according to the invention.

System 800 comprises a user device 810 for feature extraction and data compression and a recognition system 820 (or "back-end") for final signal recognition. User device 810 and recognition system 820 may be a mobile phone and a remote server 820, respectively.

System 800 further comprises a data network 805 defining a transmission channel for data exchange between the user device 810 and the recognition system 820.

In the block diagram shown in FIG. 8, user device 810 comprises a conversion unit 801, wherein an input speech is sampled and converted into a digital representation of the original input speech. Conversion unit 801 is a electro-acoustic device, including all devices occurring for converting a sound pressure waveform to a digitised signal, such as a microphone transducer, an analogue filter, an automatic gain controller and an analogue-to-digital converter.

User device 810 further comprises a feature extraction unit 802 (or "front-end") wherein the digitised speech is processed through a feature extraction algorithm to generate a series of feature vectors. The feature extraction algorithm may be implemented according to the above mentioned "AURORA" ETSI standard, so that a 14-feature vector is generated for each time frame of the input speech.

A splitting unit 803 is apt to split each 14-feature vector into seven two-feature vectors by grouping into pairs the 14 features.

A compression unit 804 is suitable to compress each of these seven two-feature vectors by the vector compression method of the invention by using seven respective predetermined codebooks, generated according to the codebook generating method of the invention. The parameters $N_{first}$, $M_{first}$, $N_{second}$ and $M_{second}$ to be used in the codebook generating method of the invention are preferably preselected according the parameter optimisation procedure of the invention. A memory unit 806 is adapted to store the (further) sub-tables and thresholds obtained through the codebook generating method of the invention.

The indexes outputted from the vector compression block 804 are sent through the transmission channel 805 to the recognition system 820 that processes the incoming indexes in order to recognise and/or reconstruct the input speech, according to conventional techniques. The transmission channel may be for example a 4.8 kbit/s wireless data channel.

As mobile units are limited in computation, memory, and battery energy, the codebook generating method and the parameter optimisation method of the invention may be advantageously executed off-line by an electronic processing system external to the mobile unit, such as for example a Personal Computer. Then, the generated extended (further) sub-tables and threshold values to be used by the vector compression unit 804 are stored in a memory (e.g., the memory unit 806) of the mobile unit.

In this way only the vector compression method of the invention—which, as shown above, requires a low computational effort—is performed by the mobile unit without overloading the limited resource thereof.

The invention claimed is:

1. A method, implemented by a computer, for generating a vector codebook providing low data compression computational effort starting from a vector codebook comprising a set of N reference vectors each comprising Q features, wherein N and Q are positive integers higher than 1, comprising the steps of:
   a) sorting, by the computer, the set of N reference vectors in ascending or descending order with respect to values associated with a predetermined feature of the set of N reference vectors;
   b) subdividing, by the computer, the set of sorted reference vectors in sub-sets;
   c) associating, by the computer, with each of said sub-sets a respective threshold value for the predetermined feature;
   d) sorting, by the computer, the reference vectors of each of said sub-sets in ascending or descending order with respect to values associated with a further predetermined feature of the set of N reference vectors;
   e) subdividing, by the computer, each of said sub-sets of sorted reference vectors in further sub-sets;
   f) associating, by the computer, with each of said further sub-sets a respective further threshold value for the further predetermined feature; and
   g) extending at least one of the sub-sets obtained in step b) with at least one reference vector of an adjacent sub-set, wherein steps d) and e) being carried out on the sub-sets extended according to step g), wherein the set of N reference vectors sorted in step a) are arranged in a table form including N rows and Q columns, each row representing a reference vector having Q features.

2. The method according to claim 1, wherein the steps d), e), and f) are repeated for a predetermined number of times, considering each time as sub-sets the further sub-sets obtained in the previous execution of the further splitting and, for performing steps d) and f), another further predetermined feature of the set of N reference vectors.

3. The method according to claim 2, further comprising:
h) extending at least one of the further sub-sets obtained in step e) with at least one reference vector of an adjacent further sub-set, the steps d), e), and f) being repeated considering each time as sub-sets the further sub-sets extended according to the previous execution of step h).

4. The method according to claim 1, wherein step g) is carried out by extending the sub-set obtained in step b) which is at the top of the set sorted in step a) by adding at the bottom thereof at least one reference vector corresponding to the reference vector that, in the set sorted in step a), is immediately below such top sub-set.

5. The method according to claim 1, wherein step g) is carried out by extending the sub-set obtained in step b) which is at the bottom of the set sorted in step a) by adding at the top thereof at least one reference vector corresponding to the reference vector that, in the set sorted in step a), is immediately above such bottom sub-set.

6. The method according to claim 1, wherein step g) is carried out by extending any other central sub-set obtained in step b) by adding at the top and at the bottom thereof at least one reference vector corresponding to the reference vector that, in the set sorted in step b), is immediately above and below such central sub-set.

7. The method according to claim 1, further comprising:
h) extending at least one of the further sub-sets obtained in step e) with at least one reference vector of an adjacent further sub-set.

8. The method according to claim 7, wherein step h) is carried out by extending each further sub-set obtained in step e) which is at the top of the corresponding extended sub-set sorted in step d) by adding at the bottom thereof at least one reference vector corresponding to the reference vector that, in the corresponding sorted extended sub-set, is immediately below such top further subset.

9. The method according to claim 7, wherein step h) is carried out by extending each further sub-set obtained in step e) which is at the bottom of the corresponding extended sub-set sorted in step d) by adding at the top thereof at least one reference vector corresponding to the reference vector that, in the corresponding sorted extended sub-set, is immediately above such bottom further sub-set.

10. The method according to claim 7, wherein step h) is carried out by extending any other central further sub-set obtained in step e) by adding at the top and at the bottom thereof at least one reference vector corresponding to the reference vector that, in the corresponding extended sub-set sorted in step d), is immediately above and below such central further sub-set.

11. A non-transitory computer readable medium encoded with a computer program comprising program instructions to carry out the steps of the method according to claim 1, when the program is executed on an electronic processing system.

12. A method, implemented by a computer, for compressing data, said data being represented by an input vector having Q features, wherein Q is an integer higher than 1, comprising the steps of:

1) providing a vector codebook, as generated by a method for generating a vector codebook providing low data compression computational effort starting from a vector codebook comprising a set of N reference vectors each comprising Q features, wherein N and Q are positive integers higher than 1, comprising the steps of:
a) sorting, by the computer, the set of N reference vectors in ascending or descending order with respect to values associated with a predetermined feature of the set of N reference vectors;
b) subdividing, by the computer, the set of sorted reference vectors in sub-sets;
c) associating, by the computer, with each of said sub-sets a respective threshold value for the predetermined feature;
d) sorting, by the computer, the reference vectors of each of said sub-sets in ascending or descending order with respect to values associated with a further predetermined feature of the set of N reference vectors;
e) subdividing, by the computer, each of said sub-sets of sorted reference vectors in further sub-sets;
f) associating, by the computer, with each of said further sub-sets a respective further threshold value for the further predetermined feature; and
g) extending at least one of the sub-sets obtained in step b) with at least one reference vector of an adjacent sub-set,
wherein steps d) and e) being carried out on the sub-sets extended according to step g),
wherein the set of N reference vectors sorted in step a) are arranged in a table form including N rows and Q columns, each row representing a reference vector having Q features;

2) identifying, by the computer, a sub-set of reference vectors among said sub-sets by progressively comparing a value of a feature of the input vector, which corresponds to said predetermined feature, with the threshold values associated with said sub-sets; and
3) identifying, by the computer, the reference vector which, within the sub-set identified in step 2) provides the lowest distortion with respect to the input vector.

13. The method according to claim 12, wherein step 3) is carried out by identifying the reference vector which has a minimum distance from the input vector.

14. The method according to claim 12, further comprising a step of associating the index of the reference vector identified in step 3) with the input vector.

15. The method according to claim 12, further comprising the step of:
4) identifying, by the computer, a further sub-set, among the further sub-sets corresponding to the sub-set identified in step 2), by progressively comparing the value of a further feature of the input vector, corresponding to said further predetermined feature, with the further threshold values associated with said further sub-sets, step 3) being performed within the further sub-set identified in step 4).

16. The method according to claim 15, wherein, the step 1) also comprises:
h) extending at least one of the further sub-sets obtained in step e) with at least one reference vector of an adjacent further sub-set to obtain extended further sub-sets, and steps 4) and 3) being performed on the extended further sub-sets.

17. A non-transitory computer readable medium encoded with a computer program comprising program instructions to carry out the steps of the method according to claim 12, when the program is executed on an electronic processing system.

18. A device suitable for data compression comprising:
a feature extraction unit for processing a digital input data so as to provide Q-feature vectors, wherein Q is an integer higher than 1;
a memory unit for storing at least one vector codebook; and
a data compression unit configured to carry out the steps of the method according to claim 12.

19. The device according to claim 18, wherein the data compression unit is also configured to associate the index of the reference vector providing the lowest distortion with the input Q-feature vector.

20. The device according to claim 18, further comprising a conversion unit for converting an input speech signal into digital speech data and to provide it to the feature extraction unit.

21. A device suitable for data compression comprising:
a feature extraction unit for processing a digital input data so as to provide Q-feature vectors, wherein Q is an integer higher than 1;
a memory unit for storing at least one vector codebook;
a data compression unit for identifying, for each input Q-feature vector provided by the feature extraction unit, a reference vector which is in the vector codebook stored in the memory unit that provides the lowest distortion with respect to the input feature vector; and
a codebook processing unit to carry out the steps of the method of claim 1.

22. A distributed speech recognition system comprising:
a user device suitable for data compression comprising:
  a feature extraction unit for processing a digital input data so as to provide Q-feature vectors, wherein Q is an integer higher than 1;
  a memory unit for storing at least one vector codebook;
  a data compression unit for identifying, for each input Q-feature vector provided by the feature extraction unit, a reference vector which is in the vector codebook stored in the memory unit that provides the lowest distortion with respect to the input feature vector;
  a codebook processing unit to carry out the steps of method for generating said at least one vector codebook providing low data compression computational effort starting from a vector codebook comprising a set of N reference vectors each comprising Q features, wherein N and Q are positive integers higher than 1, comprising the steps of:
    a) sorting the set of N reference vectors in ascending or descending order with respect to the values of a predetermined feature of the set of N reference vectors;
    b) subdividing the set of sorted reference vectors in sub-sets;
    c) associating with each of said sub-sets a respective threshold value for the predetermined feature;
    d) sorting the reference vectors of each of said sub-sets in ascending or descending order with respect to values associated with a further predetermined feature of the set of N reference vectors;
    e) subdividing each of said sub-sets of sorted reference vectors in further sub-sets;
    f) associating with each of said further sub-sets a respective further threshold value for the further predetermined feature; and
    g) extending at least one of the sub-sets obtained in step b) with at least one reference vector of an adjacent sub-set,
  wherein steps d) and e) being carried out on the sub-sets extended according to step g),
  and to store the generated vector codebook in the memory unit;
a recognition device for reconstructing and/or recognizing the digital input data; and
a transmission channel for data transmission between the user device and the recognition device.

23. The distributed speech recognition system according to claim 22, wherein the user device is adapted configured to transmit to the recognition device the indexes of the reference vectors providing the lowest distortion with the input Q-feature vectors.

* * * * *